(12) United States Patent
Kim et al.

(10) Patent No.: US 8,170,049 B2
(45) Date of Patent: May 1, 2012

(54) METHOD OF RANDOM ACCESS AND A METHOD OF TRANSPORTING INFORMATION IN BROADBAND WIRELESS ACCESS SYSTEM

(75) Inventors: Yong Ho Kim, Gyeonggi-do (KR); Ki Seon Ryu, Gyeonggi-do (KR); Gene Beck Hahn, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 252 days.

(21) Appl. No.: 12/598,920

(22) PCT Filed: Jun. 6, 2008

(86) PCT No.: PCT/KR2008/003345
§ 371 (c)(1),
(2), (4) Date: Nov. 4, 2009

(87) PCT Pub. No.: WO2009/002032
PCT Pub. Date: Dec. 31, 2008

(65) Prior Publication Data
US 2010/0135210 A1    Jun. 3, 2010

(30) Foreign Application Priority Data
Jun. 22, 2007  (KR) .................. 10-2007-0061627

(51) Int. Cl.
*H04L 12/413* (2006.01)
(52) U.S. Cl. ......................................................... 370/447
(58) Field of Classification Search .................... None
See application file for complete search history.

(56) References Cited

U.S. PATENT DOCUMENTS

| 5,384,777 A | 1/1995 | Ahmadi et al. |
| 2006/0039281 A1* | 2/2006 | Benveniste ................... 370/230 |
| 2006/0121905 A1* | 6/2006 | McDonald et al. ........... 455/445 |

OTHER PUBLICATIONS

Choi, et al., "Multichannel Random Access in OFDMA Wireless Networks," Selected Areas in Communications, IEEE Journal, vol. 24, No. 3, Mar. 2006, pp. 603-613.
Zheng, et al., "Analysis of Exponential Backoff with Multipacket Reception in Wireless Networks," Local Computer Networks, Proceedings 2006 31st IEEE Conference, Nov. 2006, pp. 855-862.

* cited by examiner

*Primary Examiner* — Raj Jain
(74) *Attorney, Agent, or Firm* — Lee, Hong, Degerman, Kang & Waimey

(57) ABSTRACT

A method of performing random access in a broadband wireless access system is disclosed. The method includes performing first random access through at least one of a plurality of random access channels, receiving information about the number of access-failed channels among the plurality of random access channels from a base station, when the first random access fails, and performing second random access according to a probability value calculated based on the received information. The present invention increases utilization of random access channels and can effectively schedule an uplink bandwidth, thereby providing an efficient ranging method.

8 Claims, 6 Drawing Sheets

METHOD OF RANDOM ACCESS AND A METHOD OF TRANSPORTING INFORMATION IN BROADBAND WIRELESS ACCESS SYSTEM

CROSS-REFERENCE TO RELATED APPLICATIONS

This application is the National Stage filing under 35 U.S.C. 371 of International Application No. PCT/KR2008/003345, filed on Jun. 13, 2008, which claims the benefit of earlier filing date and right of priority to Korean Application No. 10-2007-0061627, filed on Jun. 22, 2007.

TECHNICAL FIELD

The present invention relates to a broadband wireless access system.

BACKGROUND ART

For a better understanding of the present invention, a ranging process of an OFDMA scheme will now be described in brief.

An IEEE (Institute of Electrical and Electronics Engineers) 802.16 communication system uses an orthogonal frequency division multiplexing/orthogonal frequency division multiple access (OFDM/OFDMA) scheme. A mobile station requires ranging channels and ranging codes in a ranging process. A base station allocates ranging codes, which are usable according to ranging purposes, that is, ranging types, to the mobile station.

For example, in an initial stage in which the mobile station enters a base station network, the base station allocates ranging codes related to initial ranging to the mobile station. While the mobile station performs handover, the base station allocates handover ranging codes related to handover to the mobile station. If the mobile station periodically implements ranging after entering the network, the base station allocates periodic ranging codes used for periodic ranging. If the mobile station requests a bandwidth for data communication, the base station allocates bandwidth request ranging codes to the mobile station. That is, the base station allocates ranging channels and ranging codes corresponding to ranging purposes to the mobile station, by request of mobile stations.

Ranging types classified according to ranging purposes, for example, initial ranging, handover ranging, bandwidth request ranging, and periodic ranging, will now be described.

The initial ranging is for the mobile station to adjust synchronization with the base station. The mobile station and the base station adjust accurate time offset and accurate frequency offset and control transmission power, etc by performing the initial ranging.

The periodic ranging is periodically conducted by the mobile station, which has performed the initial ranging with the base station, to adjust a channel state, etc. with the base station. To this end, the mobile station uses ranging codes allocated for the periodic ranging.

The bandwidth request ranging is for the mobile station, which has performed the initial ranging with the base station, to request that the base station allocate a bandwidth for actual communication with the base station.

FIG. 1 is a diagram illustrating a frame structure of a broadband wireless access system using an OFDMA scheme.

The OFDMA scheme is a two-dimensional access method which is a combination of a time division access (TDA) technique and a frequency division access (FDA) technique.

The OFDMA scheme is a wireless access method for simultaneously transmitting information to a plurality of mobile stations by allocating sub-carriers having different orthogonality to a plurality of users. In transmitting data using the OFDMA scheme, respective OFDMA symbols are carried on subcarriers and are then transmitted through subchannels. The subchannels refer to channels comprised of a plurality of subcarriers. In a communication system using the OFDMA scheme, a predetermined number of subcarriers may constitute one subchannel according to system environments.

Referring to FIG. 1, a horizontal axis represents an OFDMA symbol number, and a vertical axis represents a subchannel number. A frame refers to a data sequence channel transmitted for a prescribed time period by physical characteristics and includes a downlink subframe and an uplink subframe. A preamble, which is a constituent of the frame, refers to specific sequence data located at the first symbol of every frame and is used for a mobile station to synchronize with a base station or to estimate a channel.

In the frame structure, a frame control header (FCH) provides information as to channel allocation and channel codes related to a downlink map (DL-MAP). The DL-MAP indicates a medium access control (MAC) message informing a mobile station of channel resource allocation in a downlink. An uplink map (UL-MAP) is a MAC message informing the mobile station of channel resource allocation in an uplink. A burst refers to a data unit transmitted to or received from one mobile station. The size and location of the burst are identified through the DL-MAP and the UP-MAP.

A ranging subchannel will now be described with reference to FIG. 1. A random access channel can be a ranging channel or a bandwidth request channel according to usage. The ranging channel may mean an initial ranging channel, a handover ranging channel, or a periodic ranging channel according to usage.

A code division multiple access (CDMA) scheme may be used in a random access process. The ranging channel is divided into resource units capable of transmitting a CDMA code and is called ranging request opportunity or bandwidth request opportunity. The number of OFDMA symbols assigned to the CDMA code differs according to usage. For example, two OFDMA symbols may be used for initial ranging, and one or three OFDMA symbols may be used for bandwidth request ranging according to base station setting.

DISCLOSURE

[Technical Problem]

The present invention provides a random access method in a broadband wireless access system.

An object of the present invention is to provide an efficient ranging method in a broadband wireless access system using an OFDMA scheme.

Another object of the present invention is to provide an efficient random access method using a probability value based on a congestion level without unnecessarily performing backoff even when data packets collide with each other in a ranging process.

[Technical Solution]

A feature of the present invention is to efficiently improve a ranging method used in a broadband wireless access system based on an OFDMA scheme.

Another feature of the present invention is to determine whether to perform random access in a current frame by calculating a congestion level of a random access channel generated in a previous frame when a plurality of mobile stations simultaneously communicates with a base station.

Still another feature of the present invention is to calculate a probability using a congestion level in a mobile station and/or a base station, and to perform a Bernoulli trial using the probability value. Therefore, even when data packets collide, backoff is not necessarily performed during a next random access process. If a probability of collision is high, a time for a mobile station to transmit a data packet can be reduced by increasing a probability of performing random access after backoff.

In one aspect of the present invention, provided herein is a method of performing random access by a mobile station, comprising: performing first random access through at least one of a plurality of random access channels; receiving information about the number of access-failed channels among the plurality of random access channels from a base station, when the first random access fails; and performing second random access according to a probability value calculated based on the received information. The information received from the base station may be information about a congestion level calculated as a ratio of the number of collision-generated random access channels in the frame which has performed the first random access to the number of the plurality of random access channels.

In another aspect of the present invention, provided herein is a method of transmitting information for random access by a base station, comprising: receiving information about first random access from at least one mobile station through a plurality of random access channels; and transmitting information about the number of access-failed channels from a frame which has performed the first random access to a mobile station which fails in the first random access. The information about the access-failed channels may be transmitted to the mobile station which has failed in the first random access before the mobile station which has failed in the first random access performs second random access.

[Advantageous Effects]

The present invention has the following advantages.

First, since a random access method based on a congestion level is provided, utilization of a random access channel is increased and thus an uplink bandwidth is effectively scheduled.

Second, since a Bernoulli trial is carried out by calculating a probability value based on a congestion level, a probability of random access is increased in a frame immediately after packets collide. Therefore, a delay time to transmit a data packet is reduced.

Third, when a mobile station transmits a data packet to an uplink, an uplink random access time is reduced and thus high-speed communication is achieved.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the exemplary embodiments of the present invention, examples of which are illustrated in the accompanying drawings.

Figure 1:
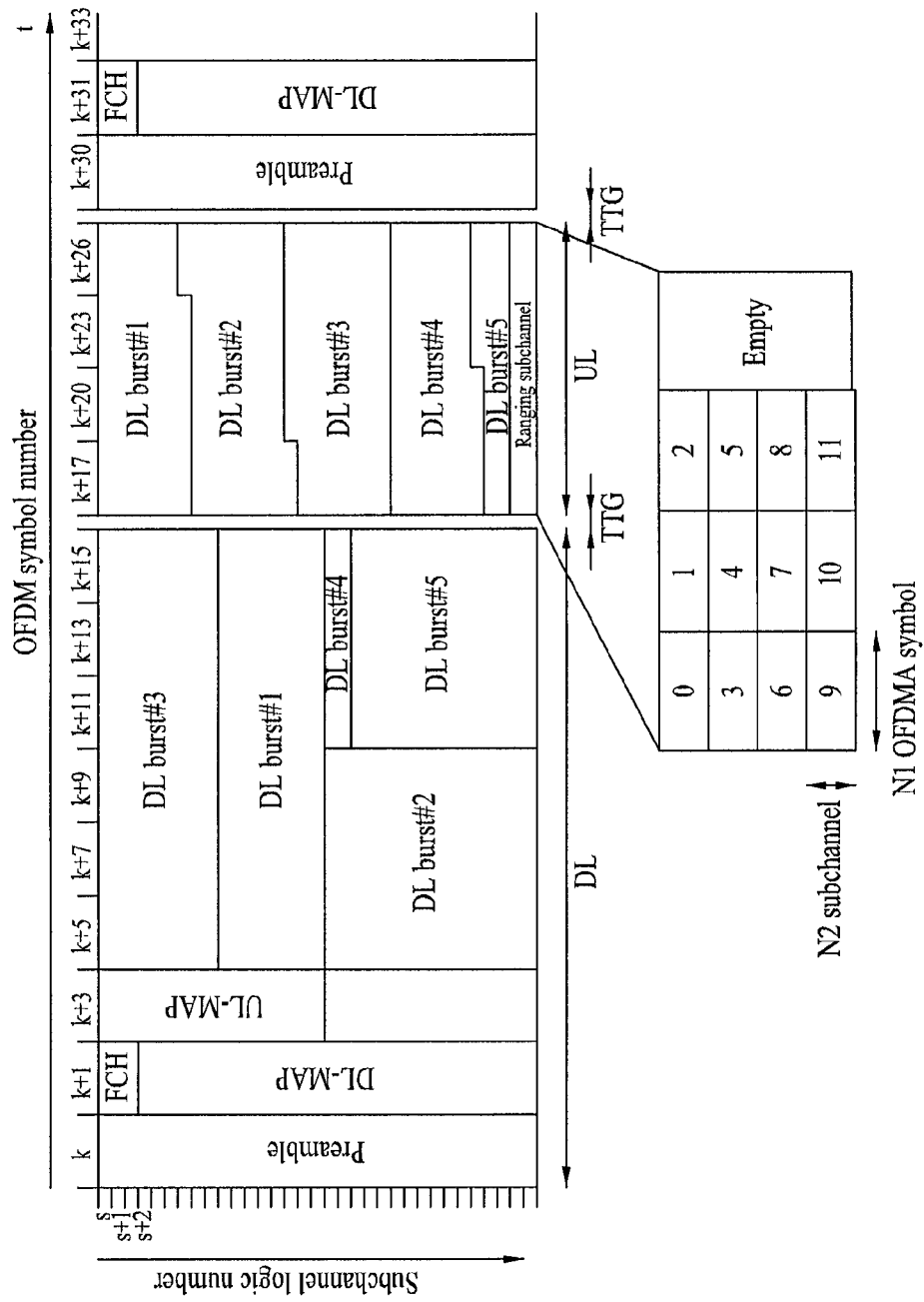
FIG. 1 is a diagram illustrating a frame structure of a broadband wireless access system using OFDMA.
Figure 2:
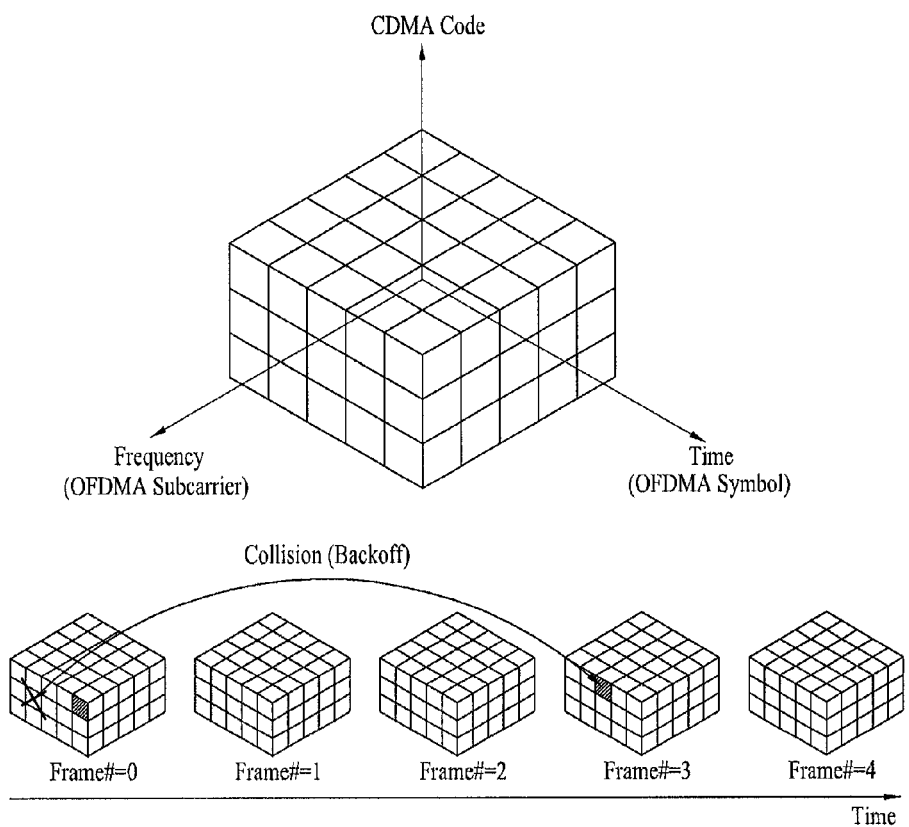
FIG. 2 is a diagram illustrating a random access method based on a CDMA code in an OFDMA system and contention resolution thereof.

FIG. 2 is a diagram illustrating a random access method based on a CDMA code in an OFDMA system and contention resolution thereof.

Referring to FIG. 2 there is shown a random access and contention resolution process based on a CDMA code in an OFDMA system. If a CDMA code transmitted in a 0th frame by a mobile station is the same as a CDMA code transmitted by another mobile station, the CDMA codes may collide. Moreover, collisions may occur when the number of mobile stations which transmit CDMA codes through a random access channel through which a mobile station transmits CDMA codes is larger than an interference level which is capable of performing decoding.

To avoid collisions, the mobile station transmits CDMA codes again after a given frame determined in each system. A method of increasing a contention window according to the number of collisions may include linear backoff, binary exponential backoff, truncated exponential backoff, or step backoff.

The exponential backoff method is widely used as an algorithm for preventing collisions. The exponential backoff is an algorithm that attempts access to a randomly selected channel within a contention window for retransmission. A contention window size is exponentially increased according to the number of collisions.

In the binary exponential backoff, a mobile station which senses an occurrence of collision increases a contention window in proportion to an exponent of 2 according to the number of collisions. The mobile station randomly determines a transmission time point within the contention window which is exponentially increased. For example, if the contention window of the mobile station in which collisions are generated for the first time is 8, the second transmission attempt is determined within the 8th frame from a current channel time point. If a contention window of 5 is selected, the mobile station attempts transmission at the 5th time point. If collisions occur again, the number of collisions becomes 2 and the contention window becomes 16. Then the third transmission attempt is randomly determined within the 16th frame from the collision-generated time point. If collisions continue to occur, a system determines that load has increased and increases the contention window. That is, system load caused by retransmission at a current time point is reduced, thereby avoiding collisions.

However, the mobile station which is subject to collisions continues to increase the contention window in proportion to an exponent of 2 even though there are no other mobile stations occupying wireless bandwidths. Therefore, a transmission delay may be remarkably increased. If a contention window size which is set to be small is identically applied without being increased according to the number of collisions, the number of collisions caused by variation in system load may be increased.

Figure 3:
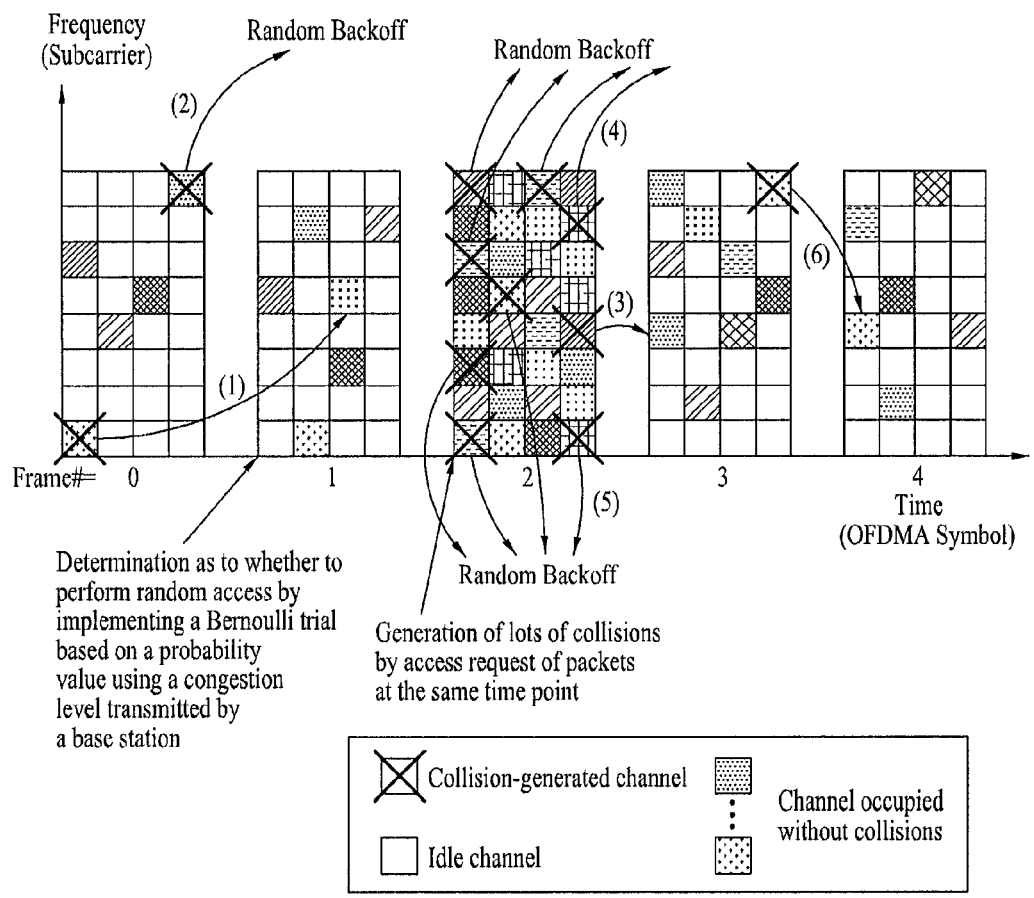
FIG. 3 is a diagram illustrating a random access method based on a congestion level according to an exemplary embodiment of the present invention.

FIG. 3 is a diagram illustrating a random access method based on a congestion level according to an exemplary embodiment of the present invention.

Referring to FIG. 3, when a mobile station is required to perform random access (for example, initial ranging when entering a network, handover ranging, bandwidth request ranging, and periodic ranging), the mobile station acquires random access channel information through an uplink map information element (UL-MAP_IE) message containing channel information of an uplink transmitted by a base station.

The mobile station randomly selects one random access channel and randomly selects a CDMA code which is to be transmitted over the selected random access channel. The selected random access channel is a two-dimensional channel comprised with frequency and time. The CDMA code varies according to purposes (for example, an initial ranging code, a handover ranging code, a periodic ranging code, and a bandwidth request ranging code) of the mobile station and the base station. Namely, the mobile station may select the CDMA code from different types of a CDMA code set according to purposes of the mobile station and the base station.

The mobile station transmits the selected CDMA code to the base station through the selected random access channel, for example, through a ranging channel. The mobile station calculates a probability value using a congestion level transmitted by the base station to perform a Bernoulli trial. The congestion level may be calculated by the mobile station through message information which is transmitted by the base station and indicates the number of collisions occurring in a previous frame.

A method of performing the Bernoulli trial according to an exemplary embodiment of the present invention will now be described. In the exemplary embodiment, the number of Bernoulli trials is 1.

First, a congestion level is calculated. The congestion level may be obtained by the ratio of the number of channels in which collisions occur to the total number of random access channels. The mobile station calculates a probability value P for determining whether to perform random access in a next frame of a collision-generated frame. The probability value P may be calculated by the following Equation 1. The probability value P, however, may be calculated by the base station according to system environments demanded by a user and then may be transmitted to the mobile station.

$$P = 1 - \frac{\text{Number of collision generated channels}}{\text{Total number of random access channels}} \quad \text{[Equation 1]}$$

For example, it is assumed that the probability value P calculated by Equation 1 is 0.3. The mobile station generates one random number using a random number generator. If a value Q obtained by dividing the generated random number by a maximum random number which can be generated by the random number generator is greater than the probability value P, a Bernoulli trial is determined to have failed. Therefore, the mobile station performs backoff and again performs random access. If the value Q is less than the probability value P, the Bernoulli trial is determined to have succeeded and random access is performed in a next frame of a collision-generated frame.

That is, the mobile station which has successfully performed the Bernoulli trial carries out the random access again in the next frame. If the Bernoulli trial fails, the mobile station performs backoff and then performs random access.

As another exemplary embodiment of the present invention, it is assumed that the number of Bernoulli trials is n. The mobile station performs the Bernoulli trial n number of times using the probability value P through Equation 1. If the number of successes exceeds 50%, the random access is implemented in the next frame. If the number of successes does not exceed 50%, the backoff is performed and then random access is performed.

The exemplary embodiment of the present invention will now be described with reference to FIG. 3.

Referring to FIG. 3, a mobile station which has attempted random access in a 0th frame can obtain information about collision-generated channels in a start part of a first frame through a message transmitted by the base station. The mobile station calculates the probability value P based on a congestion level transmitted in the first frame. The mobile station performs a Bernoulli trial based on the probability value. If the Bernoulli trial is successful, the mobile station can perform random access in the first frame (1). If the Bernoulli trial fails, the mobile station performs backoff and then performs random access (2).

Lots of collisions occur in a second frame because lots of mobile stations attempt random access in the second frame, thereby increasing a congestion level. The mobile station calculates the probability value P to perform random access based on the congestion level and performs the Bernoulli trial using the probability value P. The mobile station performs the Bernoulli trial to determine whether to implement random access in a third frame. Since the congestion level in the second frame is high, lots of mobile stations perform backoff (4) and (5) and only a few mobile stations perform random access in the third frame (3). That is, the congestion level of a previous frame does not affect the congestion level of a next frame.

If a congestion level is low, even though mobile stations which fail to perform random access in a current frame are connected to a next frame, the congestion level is not greatly increased. Therefore, the efficiency of frame use is increased by a random access method based on the probability value proposed by the present invention (6).

Figure 4:
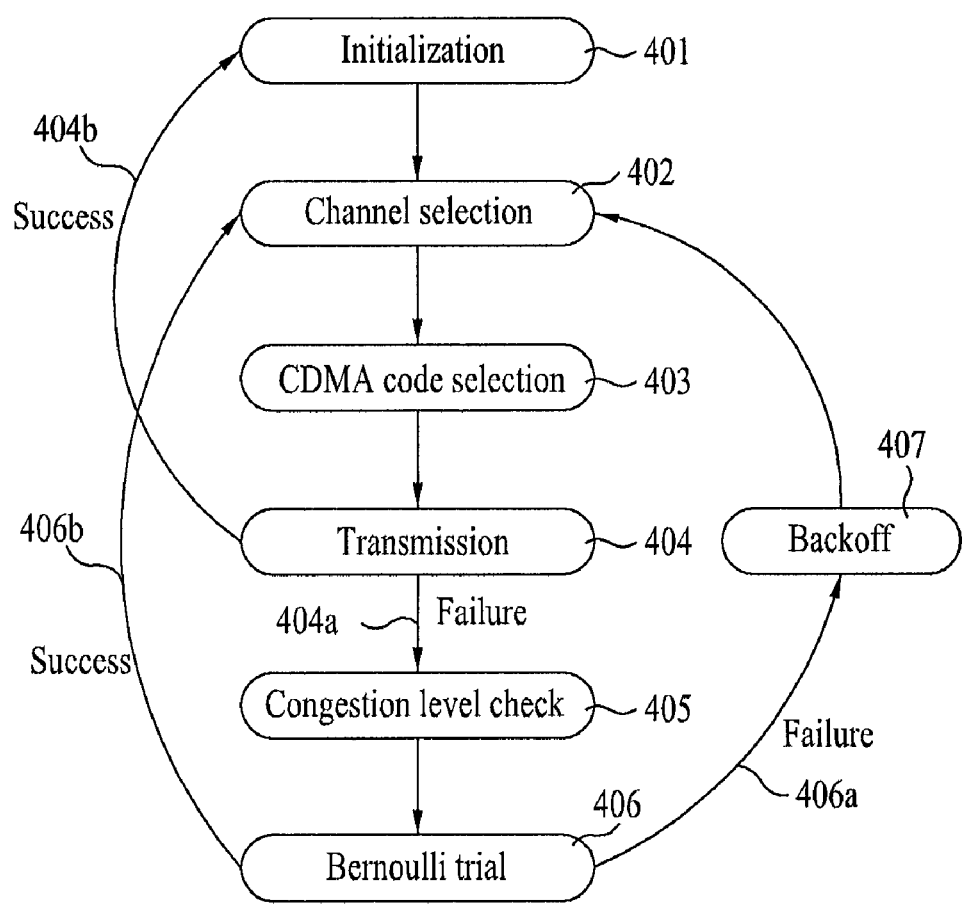
FIG. 4 is a flow chart illustrating a random access method based on a congestion level according to an exemplary embodiment of the present invention.

FIG. 4 is a flow chart illustrating a random access method based on a congestion level according to an exemplary embodiment of the present invention.

Referring to FIG. 4, a mobile station initializes a system and enters an initial stage for random access (step 401).

If it is necessary to perform initial random access when the mobile station is powered on or if a packet to be transmitted is generated, the mobile station proceeds to a channel selection stage. The mobile station requests that the base station perform random access as a necessity of performing initial random access or bandwidth request random access in the channel selection stage. The mobile station receives a message indicating a location of a random access channel of an uplink from the base station. The mobile station selects a channel to perform random access among the received random access channels using a uniform distribution (step 402). The mobile station or the base station may select one of an initial ranging channel, a handover ranging channel, a periodic ranging channel, and a bandwidth request channel as the random access channel according to purposes.

The mobile station selects any random access channel in the channel selection stage in step 402 and proceeds to a CDMA code selection stage. In the CDMA code selection stage, the mobile station selects a CDMA code, suitable for the purpose of performing random access, from a CDMA code set by identically setting a probability of selecting all CDMA codes within the code set (step 403). In the exemplary embodiment of the present invention, a type of the CDMA code set varies according to purposes (for example, an initial ranging code set, a handover ranging code set, a bandwidth request ranging code set, and a periodic ranging code set) of the mobile station and the base station.

The mobile station which has selected the random access channel and the CDMA code transmits the CDMA code to the base station through the random access channel (step 404). The mobile station can confirm whether random access is successful through a response message (for example, a ranging response (RNG-RSP) message) transmitted by the base station in a next frame.

If random access fails, the mobile station proceeds to a congestion level checking stage (step 404a). If random access is successful, the mobile station completes a random access procedure and returns to the initial stage to be ready for the next random access (step 404b).

In the congestion level checking stage, the mobile station confirms a congestion level by checking an indicator representing congestion levels of random access traffic transmitted by the base station in a previous frame (step 405).

One exemplary embodiment for indicating a congestion level in the congestion level checking stage is as follows. The base station may calculate a congestion level as the ratio of the number of collision-generated channels to the total number of random access channels. The base station may transmit a maximum congestion level as a specific value so that all mobile stations perform a backoff algorithm. The specific value may be set such that a congestion level is 1. Alternatively, the base station may notify the mobile station of the number of collision-generated channels in a previous frame, so that the mobile station may calculate the congestion level.

After confirming the congestion level, the mobile station proceeds to a Bernoulli trial stage (step 406). It is assumed in the exemplary embodiment of the present invention that the number of Bernoulli trials is 1. The Bernoulli trial may be calculated according to independent trial theorem. In the Bernoulli trial stage, the mobile station determines a probability value P to perform the Bernoulli trial and implements the Bernoulli trial. The probability value P may be calculated considering a congestion level by Equation 1 indicated above. Accordingly, if the congestion level is high, a probability of performing random access in a next random access channel is lowered. If the congestion level is low, a probability of performing random access in a next random access channel is increased.

One exemplary embodiment of the Bernoulli trial is as follows. If the probability value P is 0.3, the mobile station generates one random number using a random number generator. If a value obtained by dividing the generated random number by a maximum number which can be generated by the random number generator is greater than the probability value P, since a Bernoulli trial is determined to have failed, the mobile station performs backoff and then performs random access again. If the value is less than the probability value, since the Bernoulli trial is determined to have succeeded, the mobile station directly implements random access in a next frame of a collision-generated frame.

As another exemplary embodiment for the Bernoulli trial, it is assumed that the Bernoulli trial is performed n number of times using the probability value. If the number of successes exceeds 50% after performing the Bernoulli trial n number of times, the random access is implemented in a next frame of a collision-generated frame. If the number of successes does not exceed 50%, the backoff is performed and then random access is performed to select a random access channel.

If the Bernoulli trial is successful, steps 402 to 404 are repeated to directly perform random access in a next frame. If the Bernoulli trial fails, the mobile station proceeds to a backoff stage (step 406a). Various methods may be employed to carry out a backoff algorithm. In the exemplary embodiment of the present invention, it is assumed that a binary exponential backoff algorithm is used. It is apparent to those skilled in the art that other backoff algorithms may be used according to requirements of a system.

After implementing the backoff algorithm, the mobile station goes to the channel selection stage for random access (step 402).

The following Table 1 illustrates an example of an UL-MAP_IE message for transmitting information related to random access of an uplink.

TABLE 1

| Syntax | Size | Notes |
| --- | --- | --- |
| UL-MAP_IE( ){ | | |
| CID | 16 bits | |
| UIUC | 4 bits | |
| If(UIUC==12){ | | |
| OFDMA Symbol offset | 8 bits | |
| Subchannel | 7 bits | |
| No. OFDMA Symbols | 7 bits | |
| No. subchannels | 7 bits | |
| Ranging Method | 2 bits | 0b00- Initial ranging/handover ranging during two symbols<br>0b01- Initial ranging/handover ranging during four symbols<br>0b10- BW request/periodic ranging during one symbol<br>0b11- BW request/periodic ranging during three symbols |
| Dedicated ranging indicator | 1 bit | 0: OFDMA area and ranging method are defined for a general ranging purpose<br>1: OFDMA area and ranging method are defined for a ranging purpose used for a dedicated CDMA code and transmission opportunity allocated to a MOB_PAG-ADV message or MOB_SCN-RSP message. |
| No. Collision of previous frame | 7 bits | Number of collision-generated random access channels (ranging channels)<br>0xff: Maximum congestion level in which all mobile stations are capable of performing exponential backoff |
| } | | |

The UL-MAP_IE message of Table 1 may include a connection identifier (CID) and an uplink information usage code (UIUC). The UL-MAP_IE message may further include information as to an OFDMA symbol offset, the number of OFDMA symbols, a subchannel, and the number of subchannels. The UL-MAP_IE message may also include information as to a ranging method and a dedicated ranging indicator.

The ranging method is expressed as two bits. In the ranging method, 0b00 indicates initial ranging and handover ranging during two symbols, 0b01 indicates initial ranging and handover ranging during four symbols, 0b10 indicates bandwidth request ranging and periodic ranging during one symbol, and 0b11 indicates bandwidth request ranging and periodic ranging during three symbols.

In Table 1, one bit may be assigned to the dedicated ranging indicator. The dedicated ranging indicator '0' defines an OFDMA area and a ranging method used for general ranging, and the dedicated ranging indicator '1' defines an OFDMA area and a ranging method used for transmission opportunity assigned to an MOB_PAG-ADV message or MOB_SCN-RSP message and a dedicated CDMA code.

The UL-MAP_IE message may include a parameter 'No. Collisions of previous frame'. The parameter 'No. Collisions of previous frame' represents the number of collision-generated random access channels among all ranging channels. The base station may insert, before transmission, a maximum congestion level in which all mobile stations are capable of performing exponential backoff into the parameter 'No. Collisions of previous frame'.

The congestion level is calculated by the base station based on the number of collision-generated channels and is transmitted to the mobile station. However, the mobile station may calculate a congestion level of a frame using the number of collision-generated random access channels contained in the parameter 'No. Collisions of previous frame' according to requirements of a system.

The UL-MAP_IE message includes the parameter 'No. Collisions of previous frame' and may be transmitted before a mobile station which fails to perform random access performs the next random access.

The following Table 2 illustrates another example of the UL-MAP_IE message transmitting information related to random access of an uplink.

TABLE 2

| Syntax | Size | Notes |
|---|---|---|
| UL-MAP_IE( ){ | | |
| CID | 16 bits | |
| UIUC | 4 bits | |
| If(UIUC==12){ | | |
| OFDMA Symbol offset | 8 bits | |
| Subchannel | 7 bits | |
| No. OFDMA Symbols | 7 bits | |
| No. subchannels | 7 bits | |
| Ranging Method | 2 bits | 0b00-Initial ranging/handover ranging during two symbols<br>0b01-Initial ranging/handover ranging during four symbols<br>0b10- BW request/periodic ranging during one symbol<br>0b11- BW request/periodic ranging during three symbols |
| Dedicated ranging indicator | 1 bit | 0: OFDMA area and ranging method are defined for a general ranging purpose<br>1: OFDMA area and ranging method are defined for a ranging purpose used for a dedicated CDMA code and transmission opportunity allocated to a MOB_PAG-ADV message or MOB_SCN-RSP message |
| No. Collision of previous frame | 7 bits | Number of collision-generated random access channels (ranging channels)<br>0xff: Maximum congestion level in which all mobile stations are capable of performing exponential backoff |
| Channel Access Probability | 7 bits | Probability value (from 0.01 to 1) used to determine whether to perform random access or to perform random access after backoff is performed in a next channel based on a congestion level<br>0: 0.00- Perform backoff in a current channel |

TABLE 2-continued

| Syntax | Size | Notes |
|---|---|---|
| | | 1: 0.01<br>2: 0.02<br>…<br>100: 1.00- Perform random access in a current channel<br>101-255: Reserved |
| } | | |

Table 2 illustrates another example of the UL-MAP_IE message transmitting information related to random access of an uplink. A base station may further include a parameter 'Channel Access Probability' in the UL-MAP_IE message.

The parameter 'Channel Access Probability' indicates a probability value calculated in consideration of the ratio of the number of collision-generated random access channels to the total number of ranging channels. Upon receiving the parameter 'Channel Access Probability', a mobile station may perform a Bernoulli trial based on the probability value. If the parameter 'Channel Access Probability' has a value of 0, all mobile stations generating collisions during previous random access should perform backoff in a current channel. If the parameter 'Channel Access Probability' has a value of 100, all mobile stations generating collisions during a previous random access channel should perform random access in a current random access channel.

It is assumed that the UL-MAP_IE message used in exemplary embodiments which will be described hereinbelow is a message indicated in Table 1 or Table 2.

Figure 5:
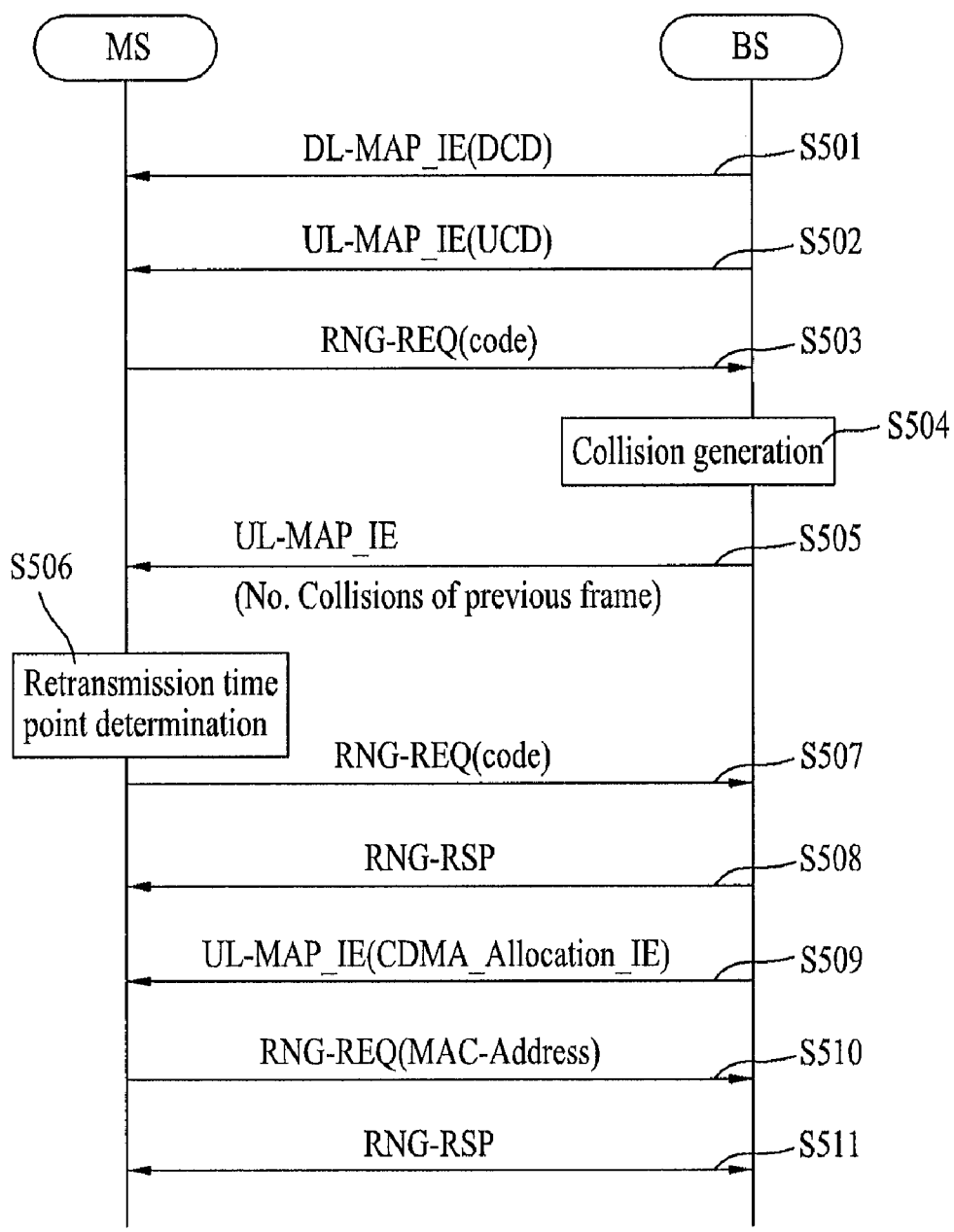
FIG. 5 is a diagram illustrating a random access method based on a congestion level in an initial ranging process according to an exemplary embodiment of the present invention.

FIG. 5 is a diagram illustrating a random access method based on a congestion level in an initial ranging process according to an exemplary embodiment of the present invention.

Referring to FIG. 5, a base station (BS) performs initial ranging by adjusting synchronization with a mobile station (MS) and adjusting time offset and transmission power with the mobile station through downlink map information element (DL-MAP_IE) and uplink map information element (UL-MAP_IE) messages. The base station receives a MAC address of the mobile station from the mobile station through an initial ranging procedure.

The base station transmits a DL-MAP_IE(DCD) message to the mobile station (step S501). The DL-MAP_IE(DCD) message indicates downlink frame information and includes a downlink channel descriptor (DCD) including a downlink channel ID and a downlink burst profile.

The base station transmits the UL-MAP_IE(UCD) message to the mobile station (step S502). The UL-MAP_IE (DCD) message indicates uplink frame information and includes an uplink channel descriptor (UCD) including an uplink channel ID and an uplink burst profile. The uplink channel ID is solely assigned from a MAC sublayer.

After receiving the UL-MAP_IE(UCD) message, the mobile station can recognize ranging codes, modulation scheme and coding scheme information, ranging channels, and ranging slots which are used for initial ranging. The mobile station selects any one of the ranging codes used for initial ranging and selects any one of ranging channels used for the initial ranging. The mobile station carries the selected ranging code in an RNG-RSP message through the selected ranging channel and transmits the RNG-RSP message to the base station (step S503). A transmission power transmitting the ranging code in step S503 may be set to a minimum transmission power level.

In an initial ranging process, a plurality of mobile stations arbitrarily selects the ranging channel and the ranging code. In this case, since a plurality of mobile stations transmits the arbitrarily selected ranging code through the arbitrarily selected channel, the same ranging codes transmitted by different mobile stations may collide in one ranging channel.

If the ranging codes collide with each other, the base station can not identify the collision-generated ranging codes. Therefore, the base station can not transmit the RNG-RSP message, which is a response message, to a plurality of mobile stations.

If collisions are generated in a channel transmitting the ranging codes, the mobile station can not receive the RNG-RSP message from the base station. Therefore, conventionally, the mobile station performs backoff and then performs random access in order to avoid collisions.

However, in the exemplary embodiment of the present invention, backoff is not always performed when collisions occur. That is, a probability that collisions occur in a next frame is calculated and a determination as to whether to perform backoff is made.

After collisions, the base station transmits an UL-MAP_IE (No. Collisions of previous frame) including information as to collision-generated channels in a previous frame to the mobile station (step S505). The UL-MAP_IE (No. Collisions of previous frame) message may include information as to the number of collision-generated channels. The base station may calculate a congestion level as the ratio of the number of collision-generated random access channels to the total number of random access channels according to requirements of the system. The base station may include the congestion level in the UL-MAP_IE message and transmit the UL-MAP_IE message to the mobile station.

The base station may insert the parameter 'Channel Access Probability' into the UL-MAP_IE message and transmit the UL-MAP_IE message to the mobile station as described with reference to Table 2. The parameter 'Channel Access Probability' is a probability value P calculated by the base station in consideration of the congestion level.

The mobile station may calculate the probability value P based on information about collision-generated random access channels included in the UL-MAP_IE message and perform a Bernoulli trial. The mobile station may calculate the congestion level based on the number of collision-generated channels included in the UL-MAP_IE message. The congestion level is a value corresponding to the ratio of the number of collision-generated random access channels to the total number of random access channels. The congestion level may be calculated by the base station and may be transmitted to the mobile station. The congestion level may be transmitted to the mobile station through the parameter 'Channel Access Probability'.

In a retransmission determining stage, the mobile station calculates the probability value P using the congestion level. The probability value P may be calculated using the above indicated Equation 1. The mobile station performs a Bernoulli trail using the probability value P. The Bernoulli trial may be calculated according to the independent trial theorem. The mobile station which has passed the Bernoulli trial increases a probability of performing random access in a next frame. If the Bernoulli trial fails, the mobile station decreases a probability of performing random access in a next frame. Namely, if the Bernoulli trial fails, the mobile station performs backoff and then performs random access (step S506).

The backoff may be implemented by various algorithms but generally uses a binary exponential backoff algorithm. The backoff indicates a standby time value that should wait for next ranging when the mobile station fails in ranging. If a backoff value is k when the mobile station fails in ranging, the mobile station performs random access after waiting for a frame for a time period randomly selected from 1 to $2^k$. The mobile station performs random access, carries a next ranging code in a ranging request message including a code, that is, an RNG-REQ(code) message, and transmits the RNG-REQ (code) message to the base station (step S507).

The backoff value k is increased by one whenever a ranging trial is made from a backoff start value. The backoff value can be increased up to a maximum ranging window size which is broadcast by the base station. A transmission power transmitting the ranging code in step S507 has a transmission power level higher than the transmission power transmitted in step S503.

Upon receiving any ranging code through any ranging channel from the mobile station, the mobile station transmits an RNG-RSP message, which is success information indicating that the ranging code has been successfully received, to the mobile station (step S508). The RNG-RSP message includes information such as an OFDMA symbol number, a random subchannel, and ranging code. The mobile station adjusts time and frequency offsets and controls a transmission power, using the information included in the RNG-RSP message.

The base station transmits, to the mobile station, an UL-MAP_IE(CDMA_Allocation_IE) message including a CDMA allocation information element (step S509). The CDMA allocation information element may include an uplink bandwidth for transmitting a ranging request (RNG-REQ) message by the mobile station.

The mobile station, which has received the UL-MAP_IE (CDMA_Allocation_IE) message from the base station, detects the CDMA allocation information element included in the UL-MAP_IE(CDMA_Allocation_IE) message. The mobile station transmits an RNG-REQ(MAC-Address) message including a MAC address to the base station using an uplink resource, that is, the uplink bandwidth, included in the CDMA allocation information element (step S510).

The base station which has received the RNG-REQ(MAC-Address) message from the mobile station transmits, to the mobile station, an RNG-RSP message including CIDs corresponding to a MAC address of the mobile station, that is, a basic CID and a primary management CID (step S511).

In the exemplary embodiment described with reference to FIG. 5, the mobile station does not always perform backoff after collisions occur in a random access channel and calculates a probability of generating collisions in a next frame. If a collision probability is low, the mobile station can reduce an unnecessary time delay by performing random access. If the collision probability is high, the mobile station performs random access after implementing backoff to avoid collisions.

Figure 6:
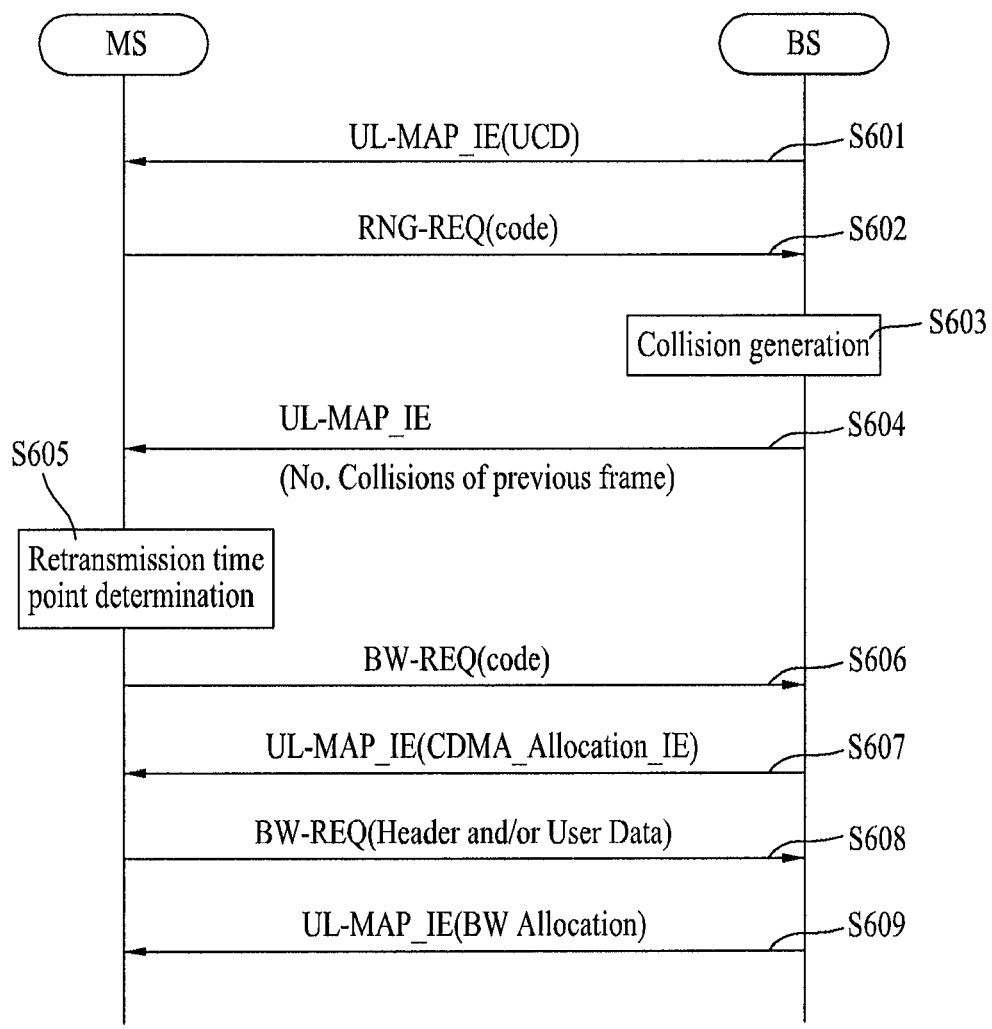
FIG. 6 is a diagram illustrating a random access method based on a congestion level in a bandwidth request ranging process according to an exemplary embodiment of the present invention.

FIG. 6 is a diagram illustrating a random access method based on a congestion level in a bandwidth request ranging process according to an exemplary embodiment of the present invention.

FIG. 6 illustrates a bandwidth request ranging method of a CDMA communication system based on the IEEE 802.16 CDMA scheme. The bandwidth request ranging is for a mobile station which has adjusted time offset and a transmission power with a base station through initial ranging to request allocation of a bandwidth in order to communicate with the base station.

The base station adjusts synchronization with the mobile station and transmits an UCD including an uplink burst profile to the mobile station through a UL-MAP_IE(UCD) (step S601).

Referring to FIG. 6, the mobile station may randomly select any one of ranging codes used for bandwidth request ranging and may randomly select any one of ranging channels used for bandwidth request ranging. The mobile station carries the selected ranging code in an RNG-RSP message through the selected ranging channel and transmits the RNG-RSP message to the base station (step S602).

In a bandwidth request ranging process, a plurality of mobile stations may randomly select the ranging channel and ranging code. In this case, since a plurality of mobile stations transmits the arbitrarily selected ranging code through the arbitrarily selected channel, the same ranging codes transmitted by different mobile stations may collide in one ranging channel (step S603).

If the ranging codes collide with each other in the ranging channel, the base station can not identify the collision-generated ranging codes. Therefore, the base station can not transmit the RNG-RSP message, which is a response message, to the plurality of mobile stations. Conventionally, if collisions are generated in a channel which transmits the ranging codes, the mobile station can not receive the RNG-RSP message from the base station, and the mobile station unconditionally performs backoff in order to avoid collision. However, in the exemplary embodiment of the present invention, backoff is not always performed when collisions occur. That is, a probability that collisions occur in a next frame is calculated and a determination as to whether to perform backoff is made based on the number of collision-generated random access channels in a previous frame.

When collisions occur, the base station transmits a UL-MAP_IE(No. Collisions of previous frame) including information about collision-generated random access channels to the mobile station (step S604). The information about the random access channels contained in the UL-MAP_IE(No. Collisions of previous frame) message may include information about the number of collision-generated random access channels. The UL-MAP_IE(No. Collisions of previous frame) message may include a congestion level as the ratio of the number of collision-generated random access channels to the total number of random access channels.

However, the mobile station may calculate a congestion level based on the information about the number of collision-generated random access channels according to requirements of a system. The base station may insert the parameter 'Channel Access Probability' into the UL-MAP_IE message and transmit the UL-MAP_IE message to the mobile station. The parameter 'Channel Access Probability' is a probability value P calculated by the base station in consideration of the congestion level.

In a retransmission determining stage, the mobile station calculates the probability value P based on the congestion level transmitted by the base station. The probability value P may be calculated using Equation 1. The mobile station which has succeeded in the Bernoulli trial increases a probability of performing random access in a next frame. If the Bernoulli trial fails, the mobile station decreases a probability of performing random access in a next frame. Namely, if the Bernoulli trial fails, the mobile station performs backoff and then performs random access (step S605). If the probability value P based on the congestion level is transmitted to the mobile station by the base station through the UL-MAP message, the mobile station may implement the Bernoulli trial using the received probability value.

The backoff may be implemented by various algorithms but generally uses a binary exponential backoff algorithm. The backoff indicates a standby time value that should wait for next ranging when the mobile station fails in ranging. If a backoff value is k when the mobile station fails in ranging, the mobile station transmits a next ranging code after waiting for a ranging channel for a time randomly selected from 1 to $2^k$. The backoff value k is increased by one whenever ranging is attempted from a ranging backoff start value and may be increased up to a maximum ranging window size which is broadcast from the base station.

The mobile station performs random access, or performs random access after conducting backoff. Therefore, the mobile station randomly selects one of ranging codes used for bandwidth request ranging. The mobile station randomly selects one of ranging channels used for bandwidth request ranging and then transmits the selected ranging code through the selected ranging channel to the base station (step S606).

When the mobile station transmits the randomly selected ranging code in step S606, the mobile station may insert a ranging code into a bandwidth request (BW-REQ) message according to purposes. However, when transmitting a CDMA code, the mobile station may transmit the CDMA code through a different message according to types of the CDMA code. Therefore, a method of transmitting the CDMA code is the same as other contention-based ranging methods (for example, initial ranging).

If the mobile station receives a response to the ranging code transmitted in step S602 from the base station, steps S603, S604, and S605 are omitted. Upon receiving the ranging code through the ranging channel from the mobile station, the base station transmits an UL-MAP_IE(CDMA_Allocation_IE) message including a CDMA allocation information element CDMA Allocation IE to the mobile station (step S607). The CDMA allocation information element includes an uplink bandwidth in which the mobile station is to transmit the BW-REQ message.

The mobile station, which has received the UL-MAP_IE (CDMA_Allocation_IE) message from the base station, detects the CDMA allocation information element included in the IL-MAP_IE(CDMA_Allocation_IE) message. The mobile station transmits a BW-REQ(Header and/or User Data) message using an uplink resource, that is, an uplink bandwidth included in the CDMA allocation information element (step S608).

The base station, which has received the BW-REQ(Header and/or User Data) message from the mobile station, assigns an uplink bandwidth for data transmission of the mobile station. The base station transmits an UL-MAP_IE(BW Allocation) message including uplink bandwidth information allocated for data transmission of the mobile station, to the mobile station (step S609). The mobile station receiving the UL-MAP_IE(BW Allocation) message recognizes the uplink bandwidth assigned for data transmission and transmits data to the base station through the uplink bandwidth.

In the exemplary embodiment described with reference to FIG. 6, a random access method based on a congestion level is used in a bandwidth request ranging process. Moreover, it is apparent to those skilled in the art that the random access method based on the congestion level may be used in other ranging methods which have not been described herein. Therefore, a description of the other ranging methods is omitted to prevent an unnecessary repetitive description.

The term 'mobile station' used herein may indicate user equipment and may refer to a user terminal in a universal mobile telecommunication system (UMTS), a mobile station in global system for mobile communication (GSM) and IS-95 system, or a notebook or a personal digital assistant supporting secure user plane location (SUPL) protocol.

Therefore, the present invention is not limited thereto and any other terms may be used to represent the same meanings.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability The present invention may be applied to all industrial fields without departing from the scope and spirit of the present invention. For example, the present invention may be applied to a broadband wireless access system. The present invention provides a random access method of a communication system and may be applied to a ranging process.

The invention claimed is:

1. A method of performing random access by a mobile station, the method comprising:
    performing first random access through at least one of a plurality of random access channels;
    receiving information about a number of access-failed channels among the plurality of random access channels from a base station when the first random access fails; and
    performing second random access according to a probability value calculated based on the received information,
    wherein the information received from the base station is information about a congestion level calculated as a ratio of a number of collision-generated random access channels in a frame which has performed the first random access to a number of the plurality of random access channels.

2. The method according to claim 1, wherein the probability value is inversely proportional to a probability of performing the second random access in a next frame of the frame which has performed the first random access.

3. The method according to claim 1, wherein the probability value is calculated by the base station as a ratio of the number of collision-generated random access channels to a total number of ranging channels.

4. The method according to claim 2, wherein the performing the second random access comprises:
    performing a Bernoulli trial using the probability value; and
    performing the second random access in the next frame of the frame which has performed the first random access or in a frame which has performed backoff by as much as a prescribed frame from the frame which has performed the first random access.

5. The method according to claim 4, wherein the performing the Bernoulli trial comprises:
    comparing a value obtained by dividing a random number extracted from a random number generator by a maximum number which can be generated by the random number generator with the probability value, and determining the Bernoulli trial as a success if the obtained value is less than the probability value and as a failure if the obtained value is equal to or greater than the probability value; and
    performing the second random access in the next frame of the frame which has performed the first random access when the Bernoulli trial is successful, and performing the second random access in the frame which has performed backoff by as much as the prescribed frame from the frame which has performed the first random access when the Bernoulli trial is unsuccessful.

6. The method according to claim 4, wherein the performing the second random access comprises:
    performing the Bernoulli trial by n number of times using the probability value;
    performing the second random access in the next frame of the frame which has performed the first random access when a number of the successful Bernoulli trial is greater than a number of the unsuccessful Bernoulli trial; and
    performing the second random access in the frame which has performed backoff by as much as the prescribed frame from the frame which has performed the first random access when the number of the successful Bernoulli trial is equal to or less than the number of the unsuccessful Bernoulli trial.

7. A method of transmitting information for random access by a base station, the method comprising:
    receiving information about first random access from at least one mobile station through a plurality of random access channels; and
    transmitting information about a number of access-failed channels from a frame which has performed the first random access to a mobile station which has failed the first random access,
    wherein the information about the number of access-failed channels is transmitted to the mobile station which has failed the first random access before the mobile station performs second random access.

8. The method according to claim 7, wherein the information about the number of access-failed channels is calculated as a ratio of a number of collision-generated random access channels to a number of random access channels in the frame which has performed the first random access.

* * * * *